United States Patent
Isci et al.

(10) Patent No.: US 8,423,998 B2
(45) Date of Patent: Apr. 16, 2013

(54) SYSTEM AND METHOD FOR VIRTUAL MACHINE MULTIPLEXING FOR RESOURCE PROVISIONING IN COMPUTE CLOUDS

(75) Inventors: Canturk Isci, West New York, NJ (US); Jeffrey O. Kephart, Cortlandt, NY (US); Xiaoqiao Meng, Yorktown Heights, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/793,897

(22) Filed: Jun. 4, 2010

(65) Prior Publication Data

US 2011/0302578 A1 Dec. 8, 2011

(51) Int. Cl.
*G06F 9/46* (2006.01)

(52) U.S. Cl.
USPC .............................. 718/1; 717/176; 717/177

(58) Field of Classification Search ...... 718/1; 717/176, 717/177
See application file for complete search history.

(56) References Cited

U.S. PATENT DOCUMENTS

| 2007/0043860 A1 | 2/2007 | Pabari |
| 2008/0295096 A1 | 11/2008 | Beaty et al. |
| 2009/0070771 A1 | 3/2009 | Yuyitung et al. |
| 2009/0133018 A1 | 5/2009 | Kaneki |
| 2009/0198766 A1 | 8/2009 | Chen et al. |
| 2009/0307597 A1 | 12/2009 | Bakman |
| 2010/0023941 A1 | 1/2010 | Iwamatsu |
| 2010/0100877 A1* | 4/2010 | Greene et al. ............ 718/1 |
| 2010/0281478 A1* | 11/2010 | Sauls et al. ............ 718/1 |

OTHER PUBLICATIONS

Ajiro, Y., et al. "Improving Packing Algorithms for Server Consolidation" 33rd International Computer Measurement Group Conference. Dec. 2007. (9 Pages).
Bennani, M., et al. "Resource Allocation for Autonomic Data Centers Using Analytic Performance Models" 2005 International Conference on Autonomic Computing. Jun. 2005. (12 Pages).
Cardosa, M., et al. "Shares and Utilities Based Power Consolidation in Virtualized Server Environments" Proceedings of the 11th IFIP/IEEE international conference on Symposium on Integrated Network Management. Jun. 2009. (8 Pages).
Choi, J., et al. "Profiling, Prediction, and Capping of Power Consumption in Consolidated Environments" Proceedings of IEEE Mascots. Sep. 2008. (10 Pages).
Gmach, D., et al. "Capacity Management and Demand Prediction for Next Generation Data Centers" 2007 IEEE International Conference on Web Services (ICWS 2007). IEEE Computer Society 2007. Jul. 2007. (8 Pages).
Govindan, S., et al. "Statistical Profiling-Based Techniques for Effective Power Provisioning in Data Centers" EuroSys '09. Proceedings of the 2009 EuroSys Conference. ACM 2009. Apr. 2009. (14 Pages).

(Continued)

*Primary Examiner* — H. S. Sough
*Assistant Examiner* — Brian Wathen
(74) *Attorney, Agent, or Firm* — Tutunjian & Bitetto, P.C.; Preston J. Young (57) ABSTRACT

A system and method for provisioning virtual machines in a virtualized environment includes determining a relationship between capacity need and performance for virtual machines (VMs) stored in memory storage media. Aggregate capacity needs for a plurality of VMs consolidated on a same physical server are estimated. VM combinations that yield capacity gains when provisioned jointly are identified such that when peaks and troughs are unaligned in capacity needs for a set of VMs, the set of VMs is provisioned together.

25 Claims, 7 Drawing Sheets

OTHER PUBLICATIONS

Gupta, D., et al. "Difference Engine: Harnessing Memory Redundancy in Virtual Machines" 8th USENIX Symposium on Operating Systems Design and Implementation. Apr. 2009. (14 Pages).

IBM. "Automatic Virtual Machine Provisioning" IP.COM No. IPCOM000128928D. Sep. 2005. pp. 1-3.

IBM. "Method and System for Self-Optimizing Virtual Appliances Placement in Virtualized Environment" IP.COM No. IPCOM000193542D. Mar. 2010. pp. 4.

IBM. "Method and System to Locate Virtual Machine in a Datacenter Environment" IP.COM No. IPCOM000175766D. Oct. 2008. pp. 1-14.

Kalyvianaki, E., et al. "Self-Adaptive and Self-Configured CPU Resource Provisioning for Virtualized Servers Using Kalman Filters" Proceedings of the 6th International Conference on Autonomic Computing, ICAC 2009. ACM 2009. Jun. 2009.(10 Pages).

Mehta, S., et al. "RECON: A Tool to Recommend Dynamic Server Consolidation in Multi-Cluster Data Centers" 2008 IEEE. IEEE/IFIP Network Operations and Management Symposium: Pervasive Management for Ubioquitous Networks and Services. Apr. 2008. pp. 363-370.

Padala, P., et al. "Adaptive Control of Virtualized Resources in Utility Computing Environments" EuroSys '07. Mar. 2007. pp. 289-302.

Urgaonkar, B., et al. "Resource Overbooking and Application Profiling in Shared Hosting Platforms" Proceedings of the Fifth Symposium on Operating Systems Design and Implementation (OSDI). Dec. 2002. pp. 1-15.

Verma, A., et al. "PMAPPER: Power and Migration Cost Aware Application Placement in Virtualized Systems" Middleware 2008. ACM/IFIP/USENIX 9th International Middleware Conference. Lecture Notes in Computer Science. LNCS 5346. Dec. 2008. pp. 243-264.

Wood, T., et al. "Memory Buddies: Exploiting Page Sharing for Smart Colocation in Virtualized Data Centers" VEE '09. Proceedings of the 5th International Conference on Virtual Execution Environments. Mar. 2009. (10 Pages).

Wood, T., et al. "Profiling and Modeling Resource Usage of Virtualized Applications" Middleware 2008. ACM/IFIP/USENIX 9th International Middleware Conference. Lecture Notes in Computer Science. Dec. 2008. (20 Pages).

* cited by examiner

SYSTEM AND METHOD FOR VIRTUAL MACHINE MULTIPLEXING FOR RESOURCE PROVISIONING IN COMPUTE CLOUDS

BACKGROUND

1. Technical Field

The present invention relates to resource provisioning of components in computer networks and more particularly to a system and method for resource provisioning using virtual machine multiplexing.

2. Description of the Related Art

In a computing cloud based on virtualization technology, consolidating multiple virtual machines (VM) onto a set of physical hosts is a common practice for saving cost. VM consolidation (also referred to as virtualization capacity planning) effectively improves the utilization of computing resources including CPU, memory, I/O, storage, etc. A component in VM consolidation is VM sizing, which refers to estimating the future resource demand by VMs. A VM sizing method must ensure the Service-Level-Agreement (SLA) of applications is not violated and unnecessary resource usage is avoided.

Most of the existing VM sizing methods solve the problem by separate-VM sizing, which means that VM sizing is done on an individual VM basis. This leads to low overall resource utilization. While conventional tools provide detailed forecasting techniques and efficiency measures for capacity planning, all the effective resource allocations focus on individual VM scenarios. Some methods also consider inter-VM interaction and compatibility for better resource consolidation. Other methods consider resourcing VMs based on their CPU, I/O boundedness, and co-locate VMs with higher potential of memory sharing.

SUMMARY

A system and method for provisioning virtual machines in a virtualized environment includes determining a relationship between capacity need and performance for virtual machines (VMs) stored in memory storage media. Aggregate capacity needs for a plurality of VMs consolidated on a same physical server are estimated. VM combinations that yield capacity gains when provisioned jointly are identified such that when peaks and troughs are unaligned in capacity needs for a set of VMs, the set of VMs is provisioned together.

A system for provisioning virtual machines in a virtualized environment, includes a service level agreement model stored on a computer readable storage media and configured to map virtual machine (VM) performance requirements to resource constraints. A joint VM sizing module is configured to estimate aggregate capacity needs for a plurality of VMs stored on storage media. A VM selection module is configured to identify VM combinations that yield capacity gains when provisioned jointly such that when peaks and troughs are unaligned in capacity needs for a set of VMs, the set of VMs is provisioned together.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Resource provisioning in virtualized systems often calls for an estimate of the capacity needs of Virtual Machines (VMs). The estimated VM size is the basis for allocating resources commensurate with workload demand and application service level agreements (SLAB). In contrast to the traditional practice of estimating the VM sizes individually, a joint-VM sizing approach is provided in which multiple VMs are provisioned in concert, based on an estimate of their aggregate capacity needs. This approach exploits statistical multiplexing among the workload patterns on multiple VMs, i.e., the peaks and valleys in one workload pattern do not necessarily coincide with the others. Thus, the unused resources of a low utilized VM can be directed to the other co-located VMs with high utilization.

Compared to individual VM based provisioning, joint-VM sizing and provisioning can greatly improve overall resource utilization. Three aspects include the following. A new SLA model establishing the basis for determining the capacity need of joint provisioning is provided. In addition, a method for estimating the size of joint-VM provisioning is described. A VM selection method that seeks to find good VM combinations for being provisioned together is also provided.

The three aspects can be seamlessly plugged into existing applications related to resource provisioning and providing resource guarantees for VMs. The methods and applications were evaluated by monitoring data collected from about 16 thousand VMs in commercial data centers. These evaluations reveal, e.g., more than 45% improvements in the resource utilization of compute clouds.

Advantageously, the system and methods provision the resource demand for multiple VMs rather than provision for VMs separately. When provisioning the resource demand for multiple VMs (hereafter referred to as joint-VM sizing), the aggregate workload is used to estimate the future resource demand. Because the peaks and troughs for each VM's workload do not always align, it is likely that the resource demand for such multiple VMs consolidated onto the same physical server is less than the sum of the resource demand by individual provisioning. Capacity saving by using joint-VM sizing is substantial.

We introduce a Service Level Agreement (SLA) model mapping application-level performance requirements to resource provisioning constraints. We propose a systematic method to estimate the total amount of capacity for provisioning multiplexed VMs as a whole. The estimated joint capacity ensures that the SLAs for individual VMs are still satisfied and no extra resources are wasted. We present a VM selection method that seeks to find the most compatible VM combinations for joint provisioning. The selected VM combinations lead to high capacity savings when provisioned as a whole.

We illustrate effective and feasible application of the present techniques for capacity planning and for providing resource guarantees by VM reservation. Both applications can be easily employed in existing cloud and virtualization management infrastructures with minimal intrusion and substantial benefits in return. In one embodiment of the capacity planning application, joint provisioning uses 45% less physical machines for hosting the same set of VMs. In one embodiment of the VM reservation application, joint provisioning improves the ratio of admitted VMs by 16% on average, and up to 75% with more stringent SLA requirements. These results demonstrate the significant potential by leveraging VM multiplexing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In virtualization based data centers, an operating system (OS) and the applications share the underlying hardware by running in isolated Virtual Machines (VMs). During initial creation and deployment, each VM is configured with certain amount of computing resources (such as CPU, memory and I/O) to satisfy the application demand. A factor for achieving economies of scale in a compute cloud is resource provisioning, which refers to matching application demand and resources allocated to the associated VM. Typically, efficient provisioning is achieved by two operations: (1) static resource provisioning, which refers to creating VMs with resources satisfying given workload demand and then consolidating these VMs onto a set of physical servers; and (2) dynamic resource provisioning, which refers to a dynamic adjustment of VM capacity to match workload fluctuations and application performance.

Static provisioning often applies to the initial stage of capacity planning. It is usually conducted offline and occurs in a monthly or seasonal time frame. In both static and dynamic provisioning, VM sizing is one important design component. VM sizing refers to the estimation of VM capacity for accommodating given workload and meeting application performance criterion. A target of VM sizing is to ensure that applications are provisioned with resources commensurate with their demand. While over-provisioning wastes costly resources, under-provisioning potentially degrades application performance and misses customers. Traditionally, VM sizing is done on a VM-by-VM basis, i.e., each VM has an estimated capacity requirement based on its dynamic workload behavior.

In a significant departure from such an individual-VM based approach, the present principles provide a joint-VM provisioning approach in which multiple VMs as a whole are provisioned based on an estimate of their aggregate capacity needs. Conceptually, joint-VM provisioning exploits statistical multiplexing among the dynamic VM demand characteristics, i.e., the peaks and valleys in one VM's demand do not necessarily coincide with the other VMs. The unused resources of a low utilized VM, can then be directed to the other collocated VMs at their peak utilization. Thus, VM multiplexing potentially leads to significant capacity savings compared to individual-VM based sizing and provisioning. The savings achieved by multiplexing are realized by packing VMs more densely into hardware resources without sacrificing application performance commitment. While this increases the overall consolidation ratio, the additional virtualization overheads associated with scheduling a higher number of VMs is generally minimal as long as the VM footprints fit in the provisioned capacity. The savings with the present joint-sizing approach are up to 40% and perhaps beyond according to an analysis on the utilization data from a production data center.

Figure 1:
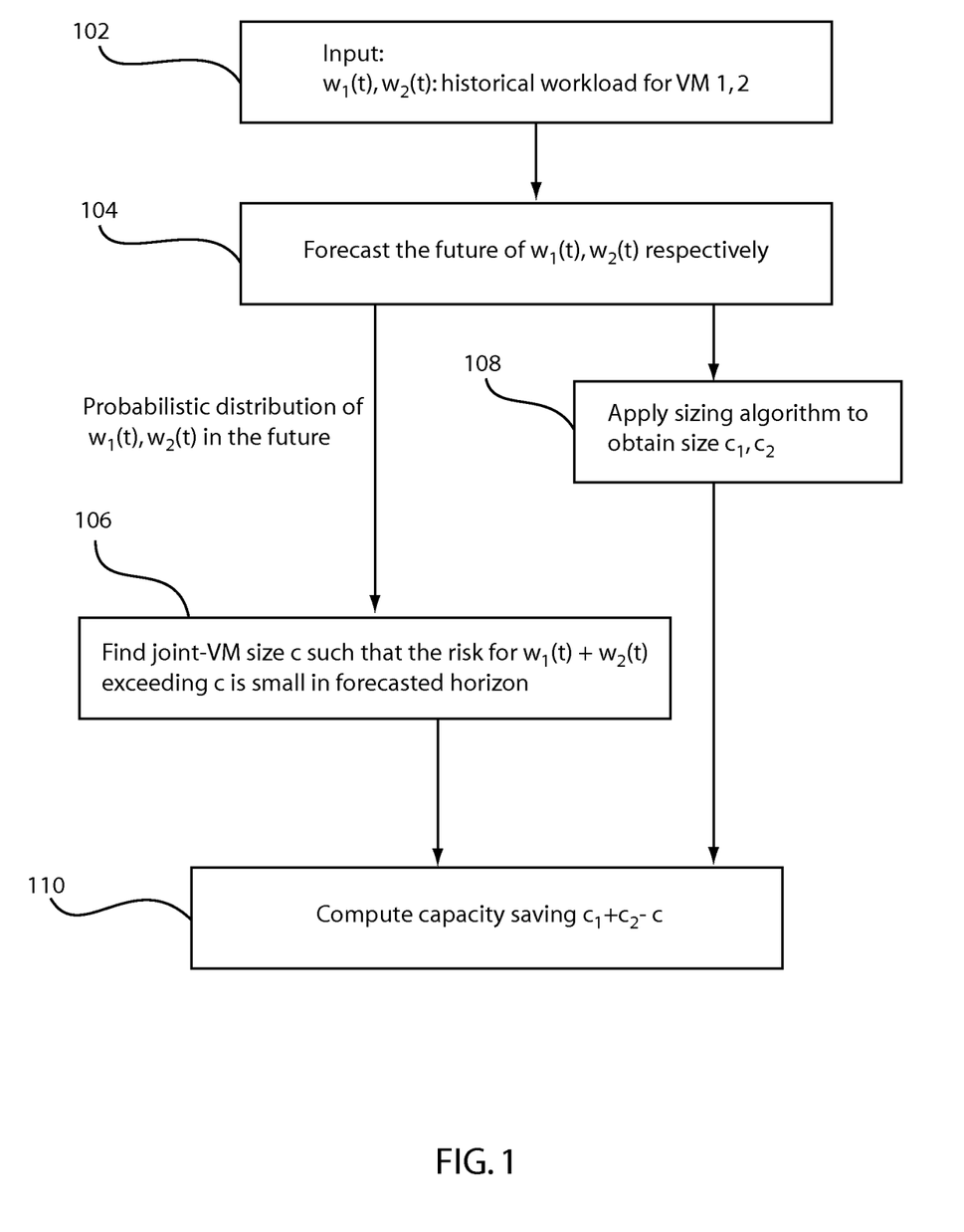
FIG. 1 is a block/flow diagram showing a joint virtual machine (VM) sizing to determine capacity savings for two virtual machine instances.

Referring now to the drawings in which like numerals represent the same or similar elements and initially to FIG. 1, a joint-VM sizing method for a scenario with two VM instances is illustratively depicted. In block 102, historical workload information is provided as input. The workload function for VM 1 and VM 2 are designated as $w_1(t)$ and $w_2(t)$, respectively. In block 104, the future resource needs for the workloads is forecasted. Using a probabilistic distribution of the forecasted future workloads, in block 106, a joint-VM size c is determined such that a risk for $w_1(t)+w_2(t)$ exceeding c is small in a forecasted horizon. In block 108, a sizing algorithm or method is applied to obtain sizes $c_1$ and $c_2$ of capacities needed for $w_1(t)$ and $w_2(t)$, respectively. In block 110, a capacity savings is computed as, e.g., $c_1+c_2-c$. Capacity savings can be employed as a metric for evaluation for grouping VMs, etc.

VM multiplexing methods can be employed in the following situations to improve resource use efficiency. This listing is illustrative and should not be construed as exhaustive or limiting in any way.

Capacity Planning for Virtualized Systems: Capacity planning is commonly employed during the initial deployment of virtualized systems. Moreover, with on-demand resource provisioning, periodic capacity planning is needed to project the dynamically increasing resource requirements. In most cases, quality-of-service levels for the applications running on the VMs determine the overall capacity requirement. For example, a simple service level can be defined as each application receiving their needed resources 95% of the time. With VM multiplexing, we can define the same service levels with much less attributed resources.

Figure 2:
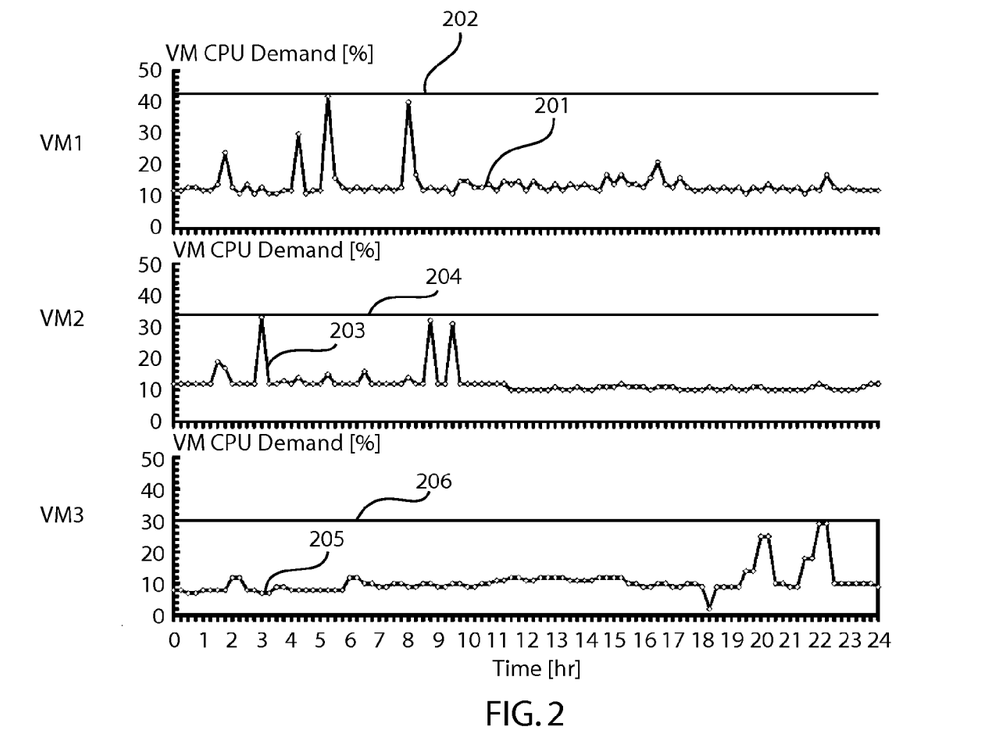
FIG. 2 shows diagrams for CPU demand behavior/capacity for each of three VMs.

Referring to FIG. 2, capacity requirements 201, 203, and 205 for three selected VMs (VM1, VM2, VM3) from actual data center traces for a 1 day period are illustratively shown. Lines 202, 204 and 206 show the capacity needed to satisfy the 95% satisfied demand service level. With a conventional capacity planning approach, the required aggregate capacity for the three VMs is around 52%.

Figure 3:
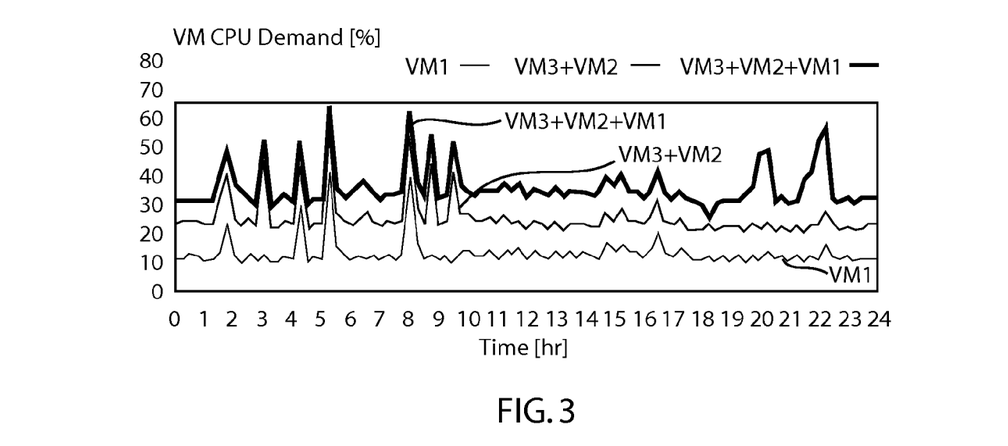
FIG. 3 is a diagram showing aggregate CPU demand behavior/capacity for the VMs in FIG. 2.

Referring to FIG. 3, joint capacity needed when the three VMs are multiplexed is illustratively shown in accordance with the present principles. Because, the VMs are chosen such that their peaks and troughs do not align, the joint capacity needed to provide the same level of service-level-agreement is significantly lower. This example uses a conservative approach to computing the joint capacity needed for the three VMs. For a chosen capacity, each VM receives the minimum of its current demand or one third of the total capacity. Then, any surplus capacity remaining from this first resource allocation step is fairly distributed among the VMs whose demand is still unsatisfied, until all demands are satisfied or all available resources are consumed.

For each chosen joint capacity, the service-level-agreement for each VM is then computed, based on the amount of time they receive their desired resources. The final joint capacity is chosen as lowest one that satisfies at least at least 95% service-level-agreement for each VM. That is, the capacity is further increased even if one of the VMs cannot reach 95% service-level-agreement. Based on this constraint, the computed joint capacity for this example is 42%, reducing the total required capacity by 20%, compared to individual VM capacity planning. In this case, the actual achieved service-level-agreement for VM1, VM2 and VM3 are 95%, 97% and 96% respectively. Thus, VM multiplexing helps achieve the same levels of quality of service with drastically lower resource requirements.

Initial VM Placement: Initial VM placement is performed when a VM is deployed or powered on for the first time. In this case, a virtualization resource manager decides which physical host is associated with the VM. In common practice, several VMs are generally deployed or powered on simultaneously, also known as group deployment or group power on.

During group power on/deployment, conventional resource managers consider each VM's requirements individually. However, using VM multiplexing in accordance with the present principles, conjunction with the resource manager can drastically improve initial placement decisions and associated resource requirements.

Providing resource guarantees for VMs: Under certain cases, service providers or the VM users employ additional resource guarantees on the deployed VMs via reservations or resource minimums. These constraints guarantee that the VMs will receive "at least" the specified amount of resources as long as the VM asks for them. These resource guarantees can be used to enforce the service-level-agreement, similar to those in capacity planning, such as the VM receives its desired resources at least 95% of the time. However, the downside of such guarantees is that they create a hard limit on the number of VMs that can be powered on in a particular host. The VMs have to pass an admission control phase during power-on, which makes sure that the hosts have enough capacity to satisfy each VM's reserved capacity.

In accordance with the present principles, VM multiplexing, in conjunction with resource-pool-level reservations can significantly improve the achievable consolidation level on virtualized hosts while respecting the same service-level agreements. In the present approach, the multiplexing method identifies sets of VMs with "compatible" behavior, e.g., VMs whose resource demand peaks and troughs do not align. Then, instead of specifying reservations for each individual VM, the present methods define reservations for each resource pool representing each set of VMs. These resource pool reservations achieve the same level of service for each VM; however, they add up to much smaller reserved resources than the aggregate resource reservations for individual VMs.

An example case with individual VM reservations in a small cluster will be described. In this case, each VM is given a reservation of 2000 MHz. Due to admission control constraints, only four of the five VMs can be simultaneously powered on. The power-on operation on "predVMO20" fails due to insufficient resources in a conventional system.

In accordance with the present principles, joint resource guarantee definitions based on VM multiplexing mitigate this. Reservations are defined over two resource pools that contain the same five VMs. With resource-pool-level reservations and VM multiplexing, all VMs can be simultaneously powered on, with equivalent service levels.

Figure 4:
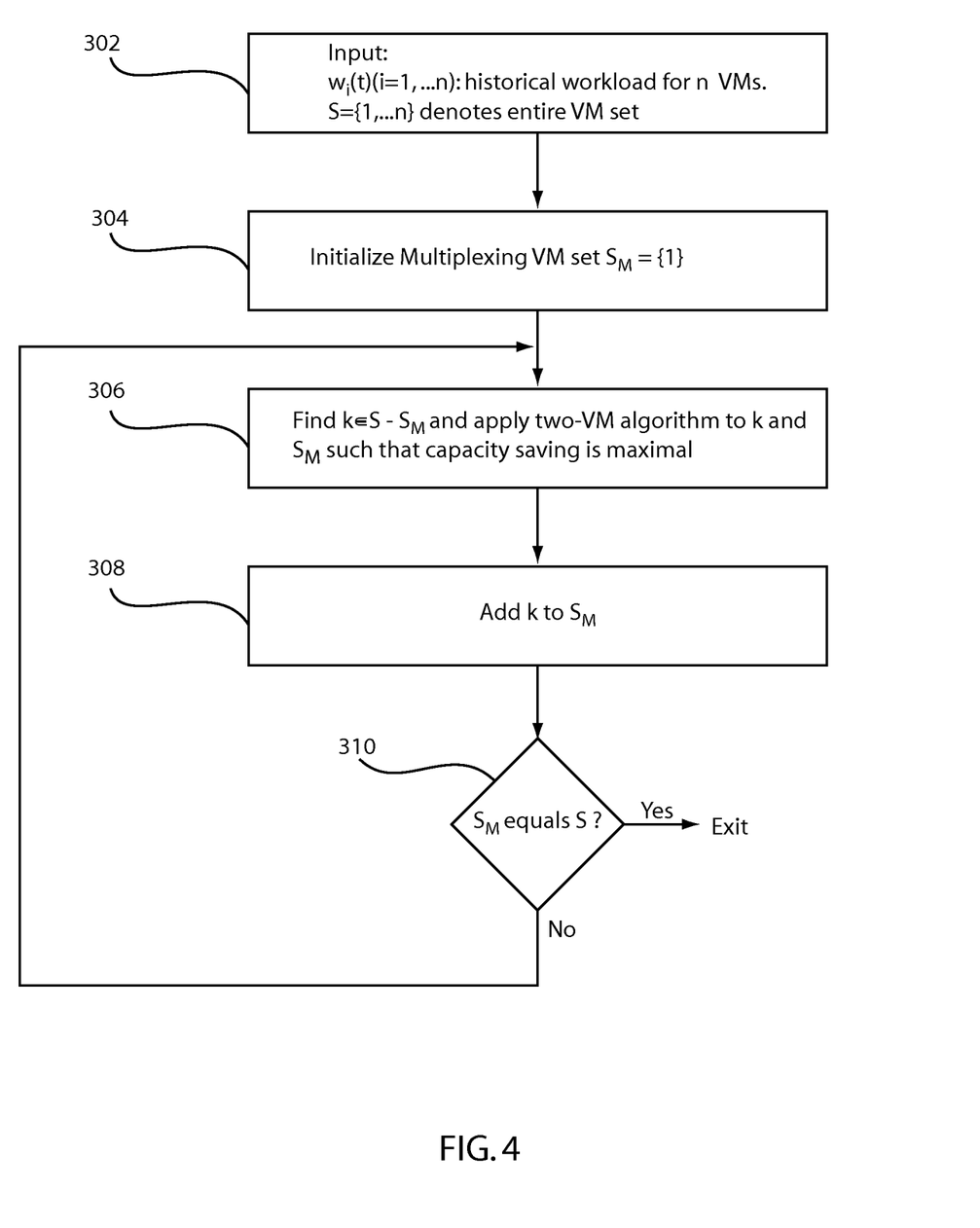
FIG. 4 is a block/flow diagram showing a joint virtual machine (VM) sizing to determine capacity savings for multiple virtual machine instances.

Referring to FIG. 4, a joint-VM sizing method for multiple VM instances is illustratively shown. In block 302, historical workloads ($w_i(t)$) are input for n VMs (i=1, ... n). S={1, ... n} denotes an entire VM set. In block 304, initialize multiplexing the VM set: $S_M$={1}. In block 306, determine k$\chi$S-$S_M$ and apply a two VM method to k and $S_M$ such that capacity savings is maximized. In block 308, add k to $S_M$. In block 310, determine whether $S_M$ equals S. If yes, then exit. If not, return to block 306 and repeat.

Figure 5:
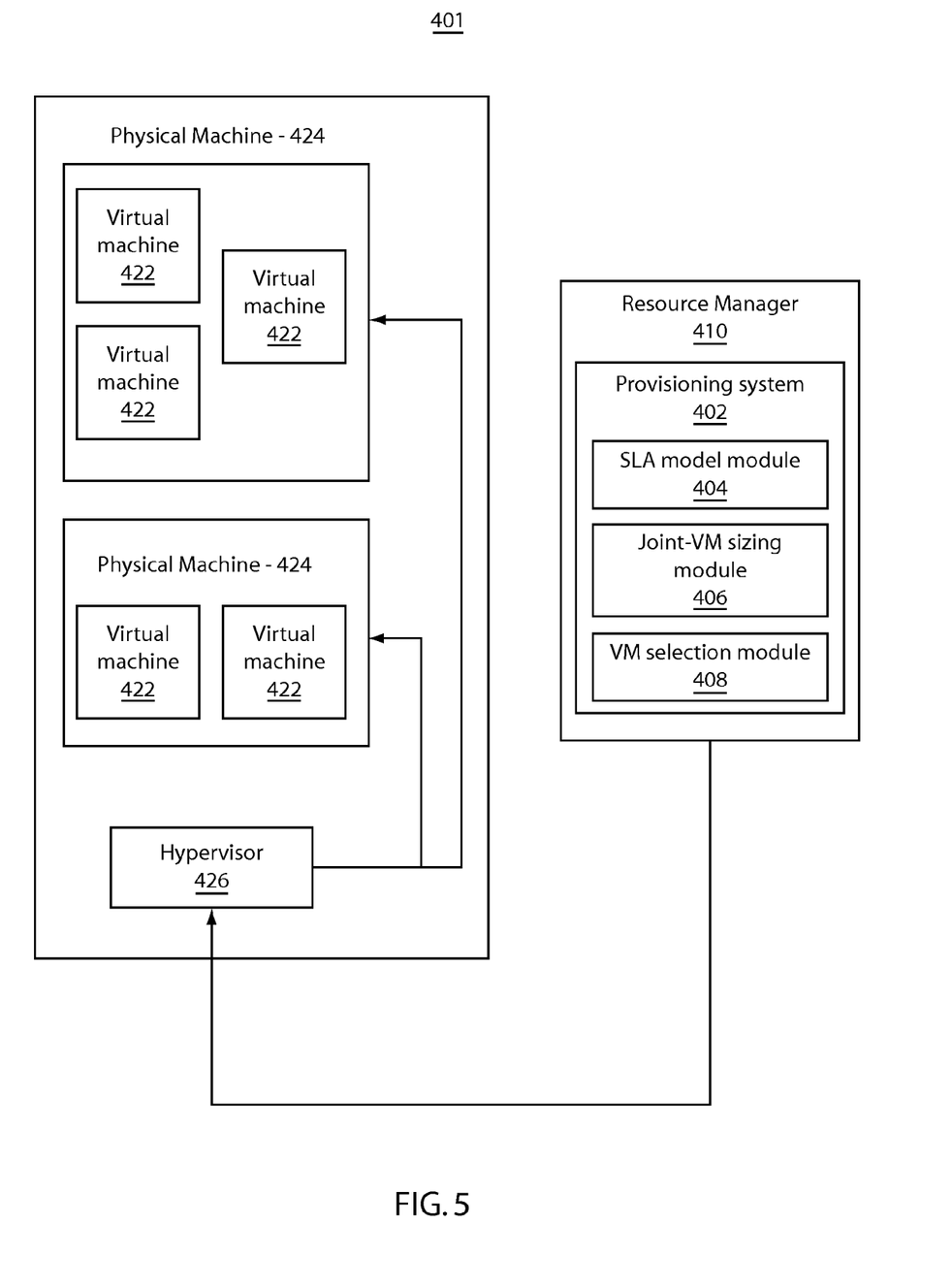
FIG. 5 is a block/flow diagram showing a system including a provisioning system in accordance with the present principles.

Referring to FIG. 5, a VM multiplexing and joint-VM resource provisioning system 402 is illustratively depicted in a virtualized environment 401. Provisioning system 402 may be included in a resource manager 410 employed to manage the resources within the environment 401, although the provisioning system 402 may be located elsewhere, e.g., in a hypervisor 426 or the like. Resource manager 410 and hypervisor(s) 426 are employed to manage datacenters or other virtual environments. Provisioning system 402 is composed of three functional modules 404, 406 and 408, which collectively capture the necessary steps for defining the multiplexed VMs, and their individual and joint capacity requirements.

The three modules include: (1) a SLA model module 404 for mapping VM performance requirements to resource constraints; (2) a joint-VM sizing module 406 to compute the total capacity needed for multiplexed VMs; and (3) a VM selection module 408 to identify "compatible" VM combinations that are good candidates for joint provisioning. These modules cooperate within a general resource provisioning framework.

Given a set of VMs 422 stored on physical machines or hosts 424, the VM selection module 408 identifies VM combinations that can achieve high capacity savings if provisioned together. The selection criterion is how complementary the demand patterns on these VMs are. For example, if the demand peaks of one VM are aligned with the demand valleys of another and vice-versa, these two VMs are regarded as highly complementary and can be grouped together by the selection module 408. Eventually the selection module 408 partitions VMs into multiple sets, where each set can be considered as a super VM.

A super VM can then be provisioned as a whole. To accomplish this, we first need to define an aggregate capacity requirement of the super VM, based on the individual requirements of its underlying VMs. To this end, the SLA model module 404 and a joint-VM sizing module 406 are employed. Specifically, the SLA model module 404 can be used to define constraints on individual VMs' capacity based on their application demands and tolerance of transient performance degradation. The SLA model module 404 permits the derivation of constraints on the super VM's resource requirements from individual VMs' SLA constraints.

Based on the derived joint-VM SLA, the joint-VM sizing module 406 proceeds to compute the super VM's capacity need. The joint-VM sizing module 406 may employ standard forecasting techniques to predict the future workload demand of the super VM (see FIGS. 1 and 4). Module 406 then constructs a probabilistic model for the forecasting uncertainty, which exists for any forecasting technique. Eventually, the sizing method calculates the total capacity requirement of the super VM by taking into account its SLA constraints, forecasted future workload and the forecasting uncertainty (se FIG. 1).

We apply such a VM multiplexing approach and demonstrate its benefits in two common cloud management operations. We use VM multiplexing and joint VM sizing for VM consolidation, then we identify compatible VMs and provision them jointly in a compute cloud with significantly reduced hardware consumption. Next, we define a joint reservation model to provide VM-level resource guarantees in a virtualized environment. By identifying compatible VMs and the SLA model, we are able to derive a joint reservation level based on individual VM reservations. We group compatible VMs in resource pools, and enforce joint reservations at the resource pool level. This enables a dramatically improved VM consolidation ratio in the cloud.

SLA MODEL: SLA models are used as the basis for allocating resources to VMs. Consider a discrete-time scenario in which time is slotted into intervals with equal length. We first define the SLA model for provisioning a single VM. Definition 1: (Single-VM SLA model). Suppose $VM_i$ is allocated a fixed capacity within a time frame [1,L]. Let $x_i(t)$ denote $VW_i$'s workload volume in time slot t. The SLA constraint for $VM_i$ is expressed as:

$$\frac{1}{k_i} \sum_{s=0}^{k_i-1} I\left(\frac{\sum_{t=sk_i+1}^{(s+1)k_i} x_i(t)}{T_i} - \text{exceed capacity}\right) \leq \beta_i \quad (1)$$

where $T_i \in \{1, 2, 3, 4 \ldots\}$, $$k_i = \frac{L}{T_i}$$

is an integer, $0 \leq \beta_i \leq 1$. In the above inequality, I is defined as:

$$I(y) = \begin{cases} 1, & \text{if } y \text{ is true} \\ 0, & \text{if } y \text{ is false.} \end{cases}$$

In Inequality (1), $$\frac{\sum_{t=sk_i+1}^{(s+1)k_i} x_i(t)}{T_i}$$

is the average workload in a time interval of length $T_i$. The above SLA constraint is interpreted as the following: if the entire time frame is divided into multiple intervals with equal length, a proportion of the intervals in which cumulative workload exceeds the VM capacity is no more than a threshold. $T_i$ and $\beta_i$ used in the SLA model are parameters specified based on associated application requirements. For example, $T_i$ reflects how much latency on average a request from the applications is expected to wait. The value of $T_i$ should be close to the normal response time experienced by the applications. $T_i$ is only allowed to take a value as a power of two (this will be explained below). $\beta_i$ is a threshold limiting the chance of a capacity violation.

The SLA model may be generic and can be applied to match various application performance requirements. For example, time-sensitive applications such as multimedia often need an immediate fulfillment of their workload demand, a SLA model with smaller $T_i$ and $\beta_i$ could match their need. On the other hand, time-elastic, long-running applications such as disk backup usually tolerate infrequent short-term congestion, accordingly a SLA model with large $T_i$ and $\beta_i$ might be suitable. When both $T_i$ and $\beta_i$ are close to zero, this SLA model is equivalent to a peak-load based sizing strategy.

The SLA model is used to derive the capacity needed for provisioning VMs. Once $T_i$ and $\beta_i$ are given, the single-VM sizing problem is equivalent to finding the minimum capacity satisfying Inequality (1). We further extend the SLA model to the joint-VM case, in which multiple VMs are provisioned together (FIG. 4).

Definition 2 (Joint-VM SLA model). Suppose n VMs are provisioned jointly and allocated a fixed capacity within a time frame [1,L]. Given n parameter tuples $(T_i, \beta_i)$ ($T_i \in \{1, 2, 4, \ldots\}$, $0 \leq \beta_i \leq 1$), a joint-VM SLA constraint is expressed as $$\frac{1}{k} \sum_{s=0}^{k-1} I\left(\frac{\sum_{t=sk+1}^{(s+1)k} \sum_{i=1}^{n} x_i(t)}{T} - \text{exceed capacity}\right) \leq \beta \quad (2)$$

where $$T = \min_i T_i, \quad k = \frac{L}{T},$$

k is an integer, $$\beta = \min_i T_i \min_i \frac{\beta_i}{T_i}.$$

Inequality (2) replaces individual VM workloads by the sum of all VM workloads. If n VMs satisfy the joint-VM SLA constraint in Inequality (2), each VM also satisfies the single-VM SLA constraint in Inequality (1) with parameters $T_i$ and $\beta_i$.

The joint-VM SLA takes the most stringent constraint from all individual single-VM SLAs. Thus, when a joint-VM size ensures that the joint-VM SLA is satisfied, it is guaranteed that individual VM's SLA is satisfied as well. This property is employed for the joint-VM sizing method. When all VMs have identical $T_i$ and identical $\beta_i$, there will be $T=T_i$ and $\beta=\beta_i$ in Definition 2, i.e., since every VM has the same SLA requirement, and the joint-VM SLA requirement will be the same as well.

JOINT-VM SIZING: A description is presented of how to estimate the capacity size (referred to as c) needed for provisioning n VMs by using the defined SLA model. This method (see FIG. 1) applies both time series forecasting and statistical modeling to infer future workload patterns, then finds c by solving the SLA constraint in Inequality (2). The inputs to this method are the history workload time series and SLA parameters for each individual VMs (block 102). The output will be the estimated c (block 106). Specifically, this method first uses Definition 2 to determine T and β that should be used in the joint-VM SLA constraint. The total workload for all VMs is then computed. The total workload is further projected to the future by standard time series forecasting techniques. Since any forecasting technique is subject to error, the forecasting error is modeled by statistical distributions. The forecasted workload plus the forecast error model constitutes a complete description of the future workload, which is further used to compute c based on the joint-VM SLA constraint. Pseudo-code for this method is provided in Table 2.

Table 2 includes three major steps in the method. These include workload forecasting (Lines 2-6 in Table 2); two approaches to deriving the forecast error distribution (Lines 7-11 in Table 2); and computing c (Lines 12-14 in Table 2).

TABLE 2

Pseudo-code for Joint-VM sizing

Input: n VM workload timeseries $x_i(t)$
       n VM SLA parameters $(T_i, \beta_i)$
1. Derive SLA parameters T and β by Definition 2
2. For each VM i
3.     Decompose $x_i(t) \mapsto x_i(t) = \hat{x}_i(t) + \tilde{x}_i(t)$
      $\hat{x}_i(t)$ trend and seasonal components
      $\tilde{x}_i(t)$: irregular fluctuations TABLE 2-continued Pseudo-code for Joint-VM sizing 4. $\hat{x}(t) = \Sigma_i \hat{x}_i(t)$, $\tilde{x}(t) = \Sigma_i \tilde{x}_i(t)$
5. Forecast $\hat{x}(t)$ in future time frame [1,L]
6. Forecast $\tilde{x}(t)$ in future time frame [1,L]
7. $\tilde{x}_e(T)$: forecasting error accumulated in T timeslots
8. If forecast method has explicit error model
9.      Compute probability density $f(\tilde{x}_e(T))$
10. else
11.     Infer $f(\tilde{x}_e(T))$ by past forecasting errors
12. For every $[1 + sT, (s + 1)T](s = 0,1,...)$ in [1,L]
13.     Compute minimum c(s) s.t.
        $\text{Prob}\{\Sigma_{t=1+sT}^{(s+1)T}(\tilde{x}(t) + \hat{x}(t)) + \tilde{x}_e(T) > c(\tau)T\} \leq \beta$
14. Find $c = \max_s c(s)$ Workload forecasting: Prior to forecasting, the workload for each VM is separated into a regular and irregular fluctuating workload. Regular workload refers to all those identifiable deterministic patterns such as trend, cycles and seasonality. Various time series techniques can be applied to extract such patterns. The irregular fluctuating workload is the residual after removing the regular workload. For ease of illustration, let $x_i(t)$ denote the workload on VM i (i=1, 2, ..., n), $\hat{x}_i$ and $\tilde{x}_i(t)$ denote the regular and fluctuating workloads respectively. The next step is to forecast the aggregate regular workload $\Sigma_i^n \hat{x}_i(t)$ and the aggregate fluctuating workload $\Sigma_i \tilde{x}_i(t)$. These two types of workload are forecasted separately. Forecasting $\Sigma_i \hat{x}_i(t)$ may be done by simply assuming the regular patterns will repeat in the future, e.g., a steadily increasing trend will still increase at the same rate; a daily seasonality continues to remain in the future.

On the other hand, forecasting $\Sigma_i^n \tilde{x}_i(t)$ can be performed by any existing forecasting techniques (linear regression, ARMA, neural networks, etc.). Because the present methods are compatible with any forecasting technique, and there is no single technique widely agreed to be the best one, a best practice approach is testing and comparing those popular ones based on history workload patterns and choosing the better one in an empirical manner.

An alternative strategy in the above procedure is to directly apply trend, seasonality detection and forecasting to $\Sigma_i x_i(t)$ without breaking down individual $x_i(t)$'s. A potential drawback is that a regular pattern in $x_i(t)$ could become difficult to extract after multiple $x_i(t)$ are merged. For example, $x_1(t)$ has a regular pattern, but the average workload rate is small. $x_2(t)$ contains only fluctuating workload with a much higher average rate. By merging $x_1(t)$ and $x_2(t)$, the regular pattern in $x_1(t)$ could be easily lost.

Figure 6A:
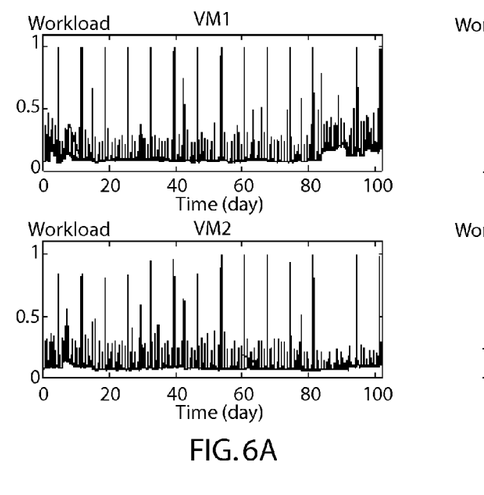
FIG. 6A shows CPU workloads for two VM's.
Figure 6B:
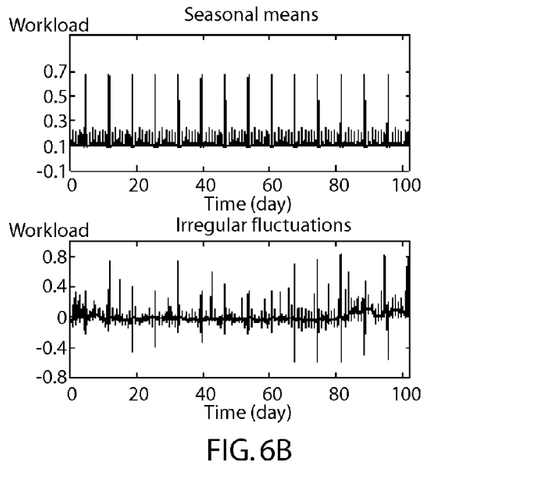
FIG. 6B shows a decomposition of the CPU workload for the VM1 in FIG. 6A.

Referring to FIGS. 6A-6D, an illustrative example of joint-VM sizing is shown by employing CPU usage for two VMs. FIG. 6A shows CPU workload for VM1 and VM2 in a 100-day period (hereafter referred to as VM1 and VM2). FIG. 6B shows the regular (seasonal means) and fluctuating patterns (irregular fluctuations) extracted from VM1's workload. VM1's workload has daily and weekly seasonality. Compared with the original workload of VM1 (FIG. 6A), the fluctuating workload (FIG. 6B) seems to have less variability and is easier to forecast.

Modeling forecasting error: The above forecasting process breaks down $\Sigma_i x_i(t)$, the aggregate workload at future time t, into:

$$\sum_{i=1}^n x_i(t) = \sum_i^n \hat{x}_i(t) + \sum_i^n \tilde{x}_i(t) + e(t) \quad (3)$$

where e(t) is the forecasting error (or uncertainty).

Because the SLA model (see Inequality (2)) is concerned about the sum of workload accumulated in a time interval [τ, τ+T], we need to compute the following:

$$\sum_{t=\tau}^{\tau+T} \sum_{i=1}^n x_i(t) = \sum_{t=\tau}^{\tau+T} \sum_i^n \hat{x}_i(t) + \sum_{t=\tau}^{\tau+T} \sum_i^n \tilde{x}_i(t) + \sum_{t=\tau}^{\tau+T} e(t) \quad (4)$$

where the third term on the right side is the forecast error accumulated over the time interval. In general, forecast error is assumed to be a stationary stochastic process. Thus, we use $\tilde{x}_e(\cdot)$ to denote the accumulated forecasting error in a time interval with length T, i.e., $$\tilde{x}_e(T) = \sum_{t=\tau}^{\tau+T} e(t)(\forall\ \tau). \quad (5)$$

Our next target is to derive the probability density function of $\tilde{x}_e(T)$. Depending on whether the forecasting method provides an explicit model for e(t), we have the following two approaches:

1) With explicit forecast error model: Some forecasting algorithms such as ARMA provide an explicit model for the forecasting error e. Their common approach is to model e(t) as:

$$e(t) = \epsilon(t) - \theta_1 \epsilon(t-1) - \theta_2 \epsilon(t-2) - \ldots - \theta_m \epsilon(t-m) \quad (6)$$

where $\epsilon(t)$ is normal white noise with variance $\sigma^2$. Combining (6) with (5), $\tilde{x}_e(T)$ becomes $$\tilde{x}_e(T) = \sum_{t=\tau-m}^{\tau+T-m} \alpha_t \epsilon(t) \quad (7)$$

where $\alpha_t$ is a linear function of $\theta_i$ (i∈[1, . . . m]) and can be easily computed from (6).

Because $\epsilon(t)$ is normal white noise, $\tilde{x}_e(T)$ is the sum of a set of normal random variables. Thus, $\tilde{x}_e(T)$ is a normal random variable with mean 0 and variance $$\sum_{t=\tau-m}^{\tau+T-m} \alpha_t^2 \sigma^2.$$

Figure 6C:
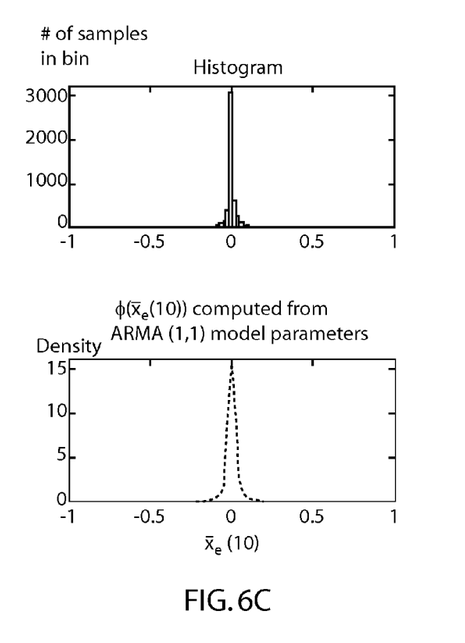
FIG. 6C shows a histogram and error density function plot for forecasting workloads for a VM with an error model.

Referring back to the example in FIGS. 6A and 6B, we use a known algorithm, ARMA(1,1), to forecast $\tilde{x}(t)$. Other algorithms may also be employed. A histogram in FIG. 6C is for all $\tilde{x}_e(10)$ samples, which are obtained by subtracting the forecasted value from the real value in the model training phase. The bottom of FIG. 6C ($\phi(\tilde{x}_e(10)$ computed from ARMA(1,1) model parameters) is the computed normal distribution which fits the histogram of FIG. 6C well.

Figure 6D:
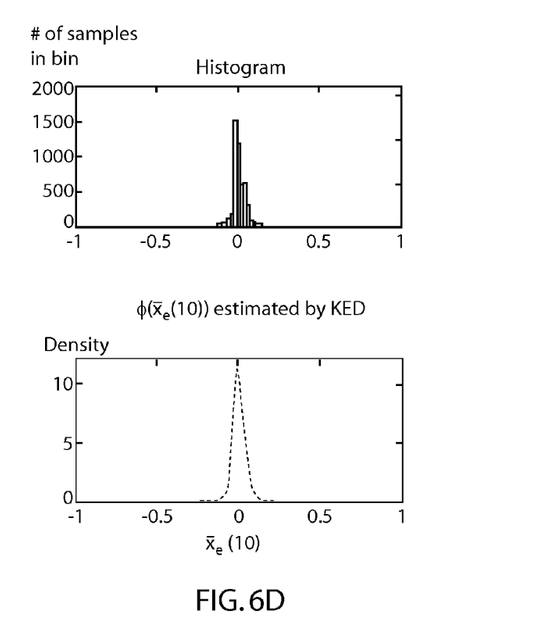
FIG. 6D shows a histogram and Kernel Density Estimation plot for forecasting workloads for a VM without an error model.

2) Without explicit forecast error model: For a large number of forecasting techniques, such as neural network based algorithms, an explicit model for the forecast error is not provided. Our strategy is collecting many realizations of $\tilde{x}_e$ (T) and using them to obtain an empirical density function. More specifically, we apply forecasting techniques to history workload and ensure that the actual forecasting error can be computed. After computing the forecasting error at each history time point, the error sum over any interval of length T constitutes a realization for $\tilde{x}_e(T)$. Next, we apply a classical Kernel Density Estimation (KDE) technique to construct an empirical density function by using all the collected realizations. We use KDE because it is a none-parametric method so there is no need to make any assumption on the distribution of $\tilde{x}_e(T)$. The KDE implementation used in this work is from Ihler and Mandel's Toolbox, which is known in the art. To illustrate this by an example, we apply a Feed-forward Neural Network (FNN) algorithm to forecast $\tilde{x}(t)$ which is obtained from the aforementioned VM1 and VM2 workloads in FIG. 6A. FIG. 6D includes a histogram of collected realizations of $\tilde{x}_e(T)$, and its corresponding density function estimated by KDE. Again, the estimated density function exhibits a good fit to the histogram in FIG. 6D.

Computing joint size c: A final step is to compute c based on Inequality (2). For this purpose, we need to compute the aggregate workload in a future time interval with length T. Let $[\tau,\tau+T]$ denote such an interval, according to Eq. (4). The aggregate workload in this interval includes three components with the last one, $\tilde{x}_e(T)$; being probabilistic. Thus, Inequality (2) is equivalent to:

$$c \geq \sum_{t=\tau}^{\tau+T} \sum_{i=1}^{n} \hat{x}_i(t) = \sum_{t=\tau}^{\tau+T} \sum_{i}^{n} \tilde{x}_i(t) + \phi^{-1}(1-\beta) \quad (8)$$

where $\phi^{-1}$ is the quantile-function for $\tilde{x}_e$ (T). A quantile-function for a probability distribution is defined as the inverse of the capacity distribution function (CDF). For the right side of Eq. (8), the first two terms are known after the workload forecasting phase, and the last term is also known after computing the density function for $\tilde{x}_e$ (T). Thus, for every future time interval with length T, we use Eq. (8) to determine a lower bound for c. By iterating all future time intervals, the maximum lower bound becomes the estimated c.

VM SELECTION FOR JOINT SIZING: As discussed, one advantage of joint VM sizing stems from the fact that the workload peaks and troughs of different VMs do not exhibit identical temporal patterns. Therefore, aligning the peaks of one VM with the troughs of another—and vice-versa—provides capacity improvements for joint VMs. A contributing factor to the achieved capacity savings with VM multiplexing is the way VMs are combined for joint provisioning. For example, a method that combines VMs with similar peak and trough temporal demand patterns cannot achieve comparable improvements compared to a method that identifies and favors VMs with complementary temporal behavior. Therefore, a simple method is provided that identifies VMs with complementary demand patterns. As a relevant problem, virtualized clusters often employ additional resource allocation constraints such as affinity and anti-affinity rules that describe which entities need to be or cannot be allocated together. Their techniques can also be incorporated into our VM selection process.

A VM selection approach uses the correlation coefficients between VMs as the indicator of their workload compatibility. For a given set of VMs, we first build a correlation matrix, C, based on the historical or forecasted demand behavior of each VM. Such correlation matrices are commonly employed in similarity analysis techniques such as principle component analysis and factor analysis. Each entry of C(i, j) may be the Pearson's correlation coefficient between the demand patterns of the two VMs i and j. We consider VM pairs with strong negative correlations as good candidates for multiplexing as a negative correlation indicates that these VMs' demand behavior changes in opposite directions.

Figure 7:
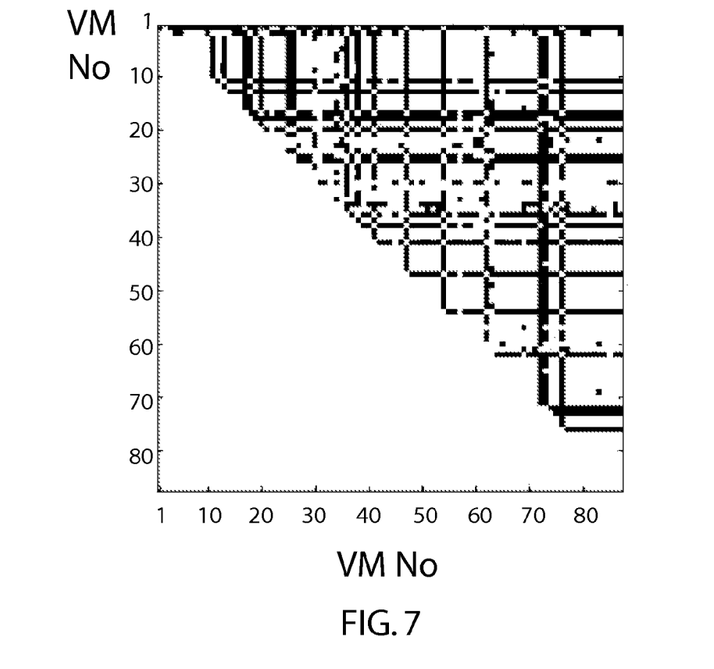
FIG. 7 is an upper diagonal correlation matrix for determining correlations between VMs.

FIG. 7 illustratively demonstrates an upper diagonal correlation matrix for an example actual cluster of 87 VMs. Here, the correlation matrix is shown as an intensity plot with higher (positive) correlations shown brighter and lower (negative) correlations shown darker. Therefore, good candidate VMs for joint sizing lie in the intersections of dark points. A VM selection simply finds the matrix entries C(k,l) with the lowest correlation coefficients and multiplexes the two VMs k and l. Once the two VMs are chosen, the $k^{th}$ and $l^{th}$ rows and columns of the matrix are invalidated so that the next set of compatible VMs can be identified. This process is preferable performed by module 408 in FIG. 5.

Two sets of VMs, selected from the virtualized cluster used for the displayed correlation matrix may have a strong negative correlation, while two other VMs may have a very high positive correlation entry. While the strong negative correlation set of VMs complement each other very well with their peaks temporally distributed in a non-overlapping manner, the latter two VMs—with high positive correlation—have highly overlapping demand characteristics with strongly aligned peaks. Therefore, the joint capacity requirement of the latter set of VMs is close to the sum of their individual capacity requirements, while significant capacity savings are realizable by joining the first set of VMs. The correlation-based approach provides a reasonably good method for VM selection.

Figure 8:
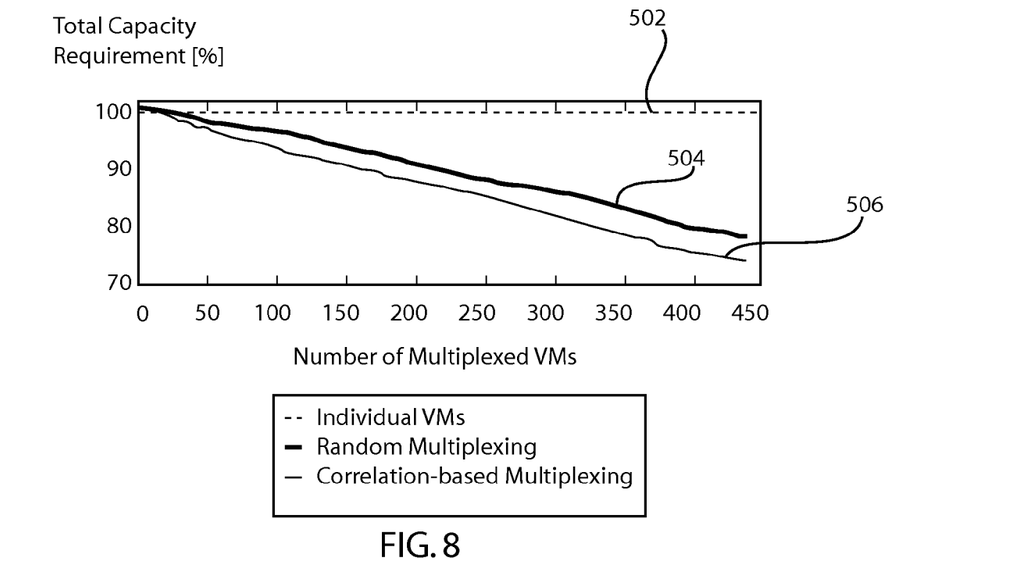
FIG. 8 is a plot illustratively showing capacity improvement with VM multiplexing and correlation-based VM selection in accordance with the present principles.

We also evaluate the quality of VM selections against a random selection approach, where VMs are randomly picked for joint sizing. For this evaluation, FIG. 8 demonstrates the achievable capacity savings—over individual VM sizing 502—with both selection methods for a large set of VM traces from an actual data center with 441 VMs. In this evaluation we assume oracle knowledge of future VM demand, thus evaluating the selection method is independent of the underlying forecasting technique. The capacity requirement for each VM is considered as the peak demand. The joint capacity is defined in a similarly conservative manner, i.e., it equals the peak demand of all multiplexed VMs. FIG. 8 depicts how the total required capacity decreases for the data center as we multiplex VMs. Both random 504 and correlation-based 506 selection schemes achieve significant capacity reduction, which demonstrates the strong potential of the joint sizing approach in accordance with the present embodiments. However, the correlation based approach 506 performs distinctly better than the random selection 504, thus corroborating the benefit of our VM selection technique.

There are additional embodiments for the VM selection technique. For example, as a data center size grows, the scalability of the correlation matrix becomes an issue. Here, one workaround is to consider a hierarchy of VM clusters that are evaluated disjointly. Second, we can extend consideration to more than two VMs at a time by using an approach similar to factor analysis, in which VMs with similar correlation characteristics are clustered into sets of arbitrary sizes.

EVALUATION OF VM MULTIPLEXING: The proposed SLA model, joint-VM sizing and VM selection constitute the three building blocks for enabling VM multiplexing in practice (See FIG. 5). These building blocks can be directly plugged into existing resource provisioning applications. Two use cases are evaluated for VM multiplexing with two common cloud management applications, and substantial benefits are demonstrated with dramatic improvements in resource use efficiency in each use case.

VM consolidation: VM consolidation is performed when a VM controller needs to create and deploy a set of VMs on a set of physical hosts. The goal of VM consolidation is to determine a mapping of VMs to physical hosts such that the minimum number of hosts are used. Existing VM consolidation schemes consist of two steps: estimating the future size for each VM, and placing VMs on physical hosts. The first step, estimating VM size, is usually solved by first forecasting the future workload, then finding a capacity size that can sufficiently cover the forecasted workload. The second step, VM placement, usually solves a bin packing type of problem. Specifically, since each VM carries a size and each physical host has fixed capacity, the VM placement problem is equivalent to packing items (VMs) into the smallest number of bins (hosts) without violating the size limit on each bin. In practice, VM placement is tackled by either heuristics or solving an integer programming problem.

By exploiting VM multiplexing, it is possible to achieve even more compact consolidation. The first step in the above procedure is replaced with the three building blocks. Briefly speaking, the VM controller first applies the SLA model (404) to describe the performance request for each VM. It then runs the VM selection (406) to partition VMs into VM groups. For each VM group, the joint-VM sizing (408) is employed to determine the capacity being allocated.

Providing Resource Guarantees for VMs: Current cloud management and virtualization tools provide mechanisms that expose explicit controls on the distribution of resources to VMs. These control methods include providing resource guarantees for VMs in the form of reservations or minimums, enforcing resource limits with limits or maximums and manipulating dynamic resource scheduling priorities with shares. With reservations, the service providers or end users can explicitly specify the computing resources that are reserved for the deployed VMs. These reservations guarantee that the VM is entitled to the specified resources, and will receive "at least" the specified amount as long as it demands it. Resource guarantees are commonly employed to impose service levels, similar to our SLA-based capacity provisioning method. Moreover the described control mechanisms can also be dynamically modulated for application to runtime, autonomic management.

A downside of employing VM reservations to provide resource guarantees is that they create a hard limit on the number of VMs that can be admitted to and powered on in a particular cluster. Each time a VM is to be powered on in the cluster, the hypervisor and the management endpoint check whether there are enough unreserved resources to satisfy the VM's reservations. The VM is admitted to the cluster for power on, only if it passes this condition. This process is known as admission control. In addition to VM power on, VMs pass through admission control when resource configurations are changed, and during dynamic placement actions that include migration of VMs across resources such as hosts, resource pools or clusters.

Individual VM-level reservations share the same inherent inefficiency as individual-VM-based capacity planning, as the reservations present a strictly additive constraint over VMs sharing the resources, without considering inter-VM interference. Here, our VM multiplexing approach again provides a highly useful model for considering multi-VM characteristics for providing VM resource guarantees, while improving overall cluster utilization. We use VM multiplexing to define joint reservations for the sets of "compatible" VMs. While there is no direct resource management mechanism to specify joint reservations, we use an overlooked abstraction of virtualized clusters, i.e., resource pools, to this effect.

Resource pools are defined within individual hosts or a cluster to provide a virtual abstraction layer that divides resources into multiple subsets. At the cluster level, one can consider the entire resource capacity of the cluster as a single monolithic root resource pool. Then, additional child resource pools can divide the cluster capacity into exclusive partitions. Resource control mechanisms such as reservations and limits can also be defined at the pool level. A resource pool hierarchy includes a root resource pool, e.g., for a multi host cluster. Two child resource pools with different reservations are defined under the root pool. A remaining unreserved capacity is managed as part of the root resource pool. VMs powered on in different child pools are constrained by the child pool resources, while VMs powered on directly under the root share the resources available to the unreserved capacity pool.

We can leverage resource-pool-level reservations in place of VM-level reservations to define joint reservations. Using our VM multiplexing methodology, we first use a SLA model to derive the corresponding $\beta$ values for the individual VM reservations. We use T=1 in our SLA model for reservations to match the reservation model used in current hypervisors, where reservations are enforced for each instantaneous sample (T=1) rather than over a tunable time window (T>1). We employ the VM selection methodology to identify compatible VMs and group them under the same resource pools. We then apply joint-VM sizing with the same $\beta$ values to define the reservation levels for each resource pool. We consider joint-VM sizing both with oracle knowledge of future demand and by using a forecasting technique.

We only consider pairs of VMs in each resource pool. While the derived joint reservations are generally higher than individual reservations, we make sure that they are substantially smaller than individual host capacities to avoid creating any artificial placement constraints.

In our evaluation, VM multiplexing, in conjunction with resource pool level joint reservations, significantly improves cloud utilization efficiency, and the achievable consolidation level on virtualized hosts while respecting the same VM-level SLA requirements. Across the [0.0, 0.2] range of $\beta$, the average improvement in the number of VMs that are admitted for power on was 16%, with up to 75% improvements for stringent reservations and small cluster sizes in this illustrative case.

VM multiplexing is leveraged to improve resource utilization efficiency in compute clouds. One of the many benefits of VM multiplexing includes that when the peaks and troughs in multiple VMs are temporally unaligned, these VMs can be provisioned together. Such joint provisioning drastically reduces the aggregate capacity requirement of the multiplexed VMs compared to provisioning each VM individually and independently. To enable VM multiplexing in practice, three design modules address challenges introduced by joint-VM provisioning. Specifically, a new SLA model used to reflect individual VM performance requirements; a joint-VM sizing technique that estimates the aggregate capacity needs for multiplexed VMs; and a VM selection method for identifying VM combinations that yield high capacity gains when provisioned jointly.

The present design modules can be seamlessly plugged into existing resource provisioning applications. VM multiplexing has been evaluated with two example applications: VM capacity planning and providing VM resource guarantees via reservations. Experiments based on data from an operational cloud demonstrate that the joint-VM provisioning significantly outperforms traditional approaches. In capacity planning, joint provisioning uses 45% less physical machines for hosting the same number of VMs. With joint-VM reservations, VM multiplexing improves the ratio of admitted VMs by 16% on average, and up to 75% with stringent SLA requirements. These numbers are for illustrative purposes only. Greater gains are contemplated.

Figure 9:
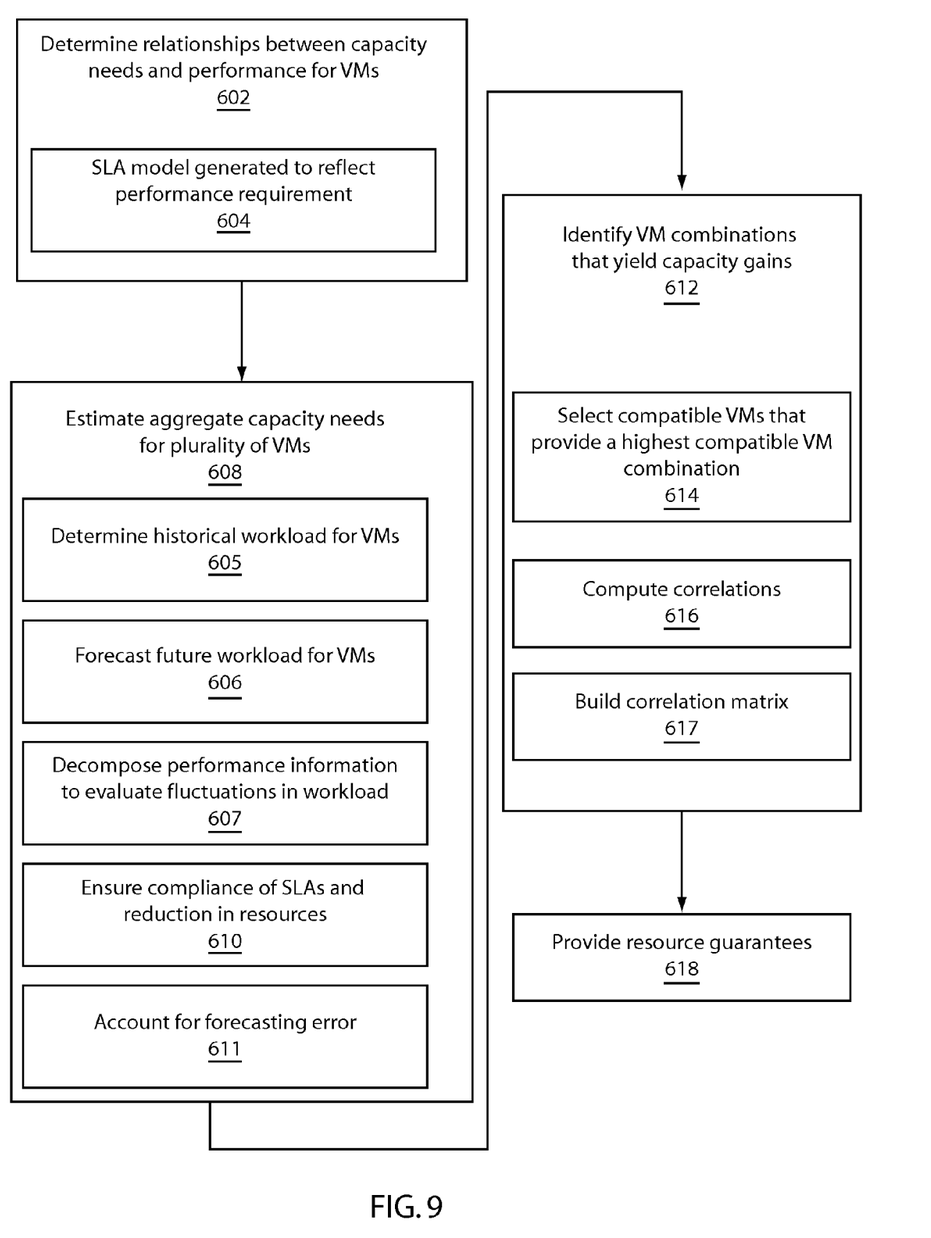
FIG. 9 is a block/flow diagram showing a system/method for provisioning VMs in accordance with the present principles.

Referring to FIG. 9, a method for provisioning virtual machines in a virtualized environment is illustratively shown in accordance with one embodiment. In block 602, relationships between capacity needs and performance are determined for virtual machines (VMs) stored in memory storage media. In block 604, a service level agreement (SLA) model may be generated to reflect performance requirements.

In block 608, aggregate capacity needs are estimated for the plurality of VMs. Aggregate capacity preferably includes determining a historical workload for each VM in block 605 and forecasting a future workload for each VM in block 606. In block 607, the capacity and performance information can be decomposed to evaluate regular and irregular fluctuations in workload of the VMs.

In block 610, satisfaction of terms of service level agreements for individual VMs are ensured/preserved while also ensuring that resource needs for the set of VMs are reduced below an aggregate of all individual VMs (e.g., taken individually and added together) in the set. In block 611, forecasting error is accounted for.

In block 612, VM combinations are identified that yield capacity gains when provisioned jointly such that when peaks and troughs are unaligned in capacity needs for a set of VMs, the set of VMs are provisioned together. In block 614, two or more VMs are selected that provide a highest compatible VM combination for joint provisioning. Identifying VM combinations may include computing correlations between two or more VMs to identify best combinations of VMs in block 616 and building a correlation matrix based on demand behavior of each VM in block 617. In block 618, resource guarantees may be provided with resource pools for the set of VMs.

Having described preferred embodiments of a system and method for virtual machine multiplexing for resource provisioning in compute clouds (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for provisioning virtual machines in a virtualized environment, comprising:
    determining a relationship between capacity need and performance for virtual machines (VMs) stored in memory storage media;
    estimating aggregate capacity needs for a plurality of VMs consolidated on a same physical server; and
    identifying VM combinations that yield capacity gains when provisioned jointly such that when peaks and troughs are unaligned in capacity needs for a set of VMs, the set of VMs is provisioned together.

2. The method as recited in claim 1, wherein determining the relationship between capacity need and performance includes generating a service level agreement (SLA) model to reflect the performance information.

3. The method as recited in claim 1, wherein estimating aggregate capacity includes preserving a service level agreement for individual VMs while reducing resource needs for the set of VMs to a level below the resource needs of an aggregate of the individual VMs.

4. The method as recited in claim 1, wherein identifying VM combinations includes selecting two or more VMs that provide a highest compatible VM combination for joint provisioning.

5. The method as recited in claim 1, wherein estimating aggregate capacity needs for consolidated VMs includes:
    determining a historical workload for each VM; and
    forecasting a future workload for each VM.

6. The method as recited in claim 1, wherein estimating aggregate capacity needs for consolidated VMs includes: evaluating regular and irregular fluctuations in workload of the VMs.

7. The method as recited in claim 1, wherein estimating aggregate capacity needs for consolidated VMs includes accounting for forecasting error.

8. The method as recited in claim 1, wherein identifying VM combinations includes:
    building a correlation matrix based on demand behavior of each VM; and
    computing correlations between two or more VMs to identify best combinations of VMs.

9. The method as recited in claim 1, further comprising providing resource guarantees with resource pools for the set of VMs.

10. A non-transitory computer readable storage medium comprising a computer readable program for provisioning virtual machines in a virtualized environment, wherein the computer readable program when executed on a computer causes the computer to:
    determining a relationship between capacity need and performance for virtual machines (VMs) stored in memory storage media;
    estimating aggregate capacity needs for a plurality of VMs consolidated on a same physical server; and
    identifying VM combinations that yield capacity gains when provisioned jointly such that when peaks and troughs are unaligned in capacity needs for a set of VMs, the set of VMs is provisioned together.

11. The computer readable storage medium as recited in claim 10, wherein determining the relationship between capacity need and performance includes generating a service level agreement (SLA) model to reflect the performance information.

12. The computer readable storage medium as recited in claim 10, wherein estimating aggregate capacity includes preserving a service level agreement for individual VMs while reducing resource needs for the set of VMs to a level below the resource needs of an aggregate of the individual VMs.

13. The computer readable storage medium as recited in claim 10, wherein identifying VM combinations includes selecting two or more VMs that provide a highest compatible VM combination for joint provisioning.

14. The computer readable storage medium as recited in claim 10, wherein estimating aggregate capacity needs for consolidated VMs includes:
    determining a historical workload for each VM; and
    forecasting a future workload for each VM.

15. The computer readable storage medium as recited in claim 10, wherein estimating aggregate capacity needs for consolidated VMs includes: evaluating regular and irregular fluctuations in workload of the VMs.

16. The computer readable storage medium as recited in claim 10, wherein estimating aggregate capacity needs for consolidated VMs includes accounting for forecasting error.

17. The computer readable storage medium as recited in claim 10, wherein identifying VM combinations includes:
   building a correlation matrix based on demand behavior of each VM; and
   computing correlations between two or more VMs to identify best combinations of VMs.

18. The computer readable storage medium as recited in claim 10, further comprising providing resource guarantees with resource pools for the set of VMs.

19. A system for provisioning virtual machines in a virtualized environment, comprising:
   a service level agreement model stored on a computer readable storage media and configured to map virtual machine (VM) performance requirements to resource constraints;
   a joint VM sizing module configured to estimate aggregate capacity needs for a plurality of VMs stored on storage media; and
   a VM selection module configured to identify VM combinations that yield capacity gains when provisioned jointly such that when peaks and troughs are unaligned in capacity needs for a set of VMs, the set of VMs is provisioned together.

20. The system as recited in claim 19, wherein the joint VM sizing module ensures satisfaction of terms of service level agreements for individual VMs and ensures that resource needs for the set of VMs is below an aggregate of the resource needs for individual VMs.

21. The system as recited in claim 19, wherein the VM selection module includes a correlation matrix employed to select two or more VMs that provide a highest compatible VM combination for joint provisioning.

22. The system as recited in claim 19, wherein the performance requirements include:
   a historical workload for each VM;
   and a future workload forecast for each VM.

23. The system as recited in claim 19, wherein the performance requirements include regular and irregular fluctuations in workloads of the VMs.

24. The system as recited in claim 19, wherein the joint VM sizing module accounts for forecasting error.

25. The system as recited in claim 19, wherein the VM selection module computes correlations between two or more VMs to identify best combinations of VMs.

* * * * *